July 5, 1949.　　　T. L. SHERMAN　　　2,475,295
CRANKLESS MECHANISM

Filed March 7, 1946　　　　　　　4 Sheets-Sheet 1

INVENTOR
Thomas L. Sherman
BY
Marechal & Biebel
ATTORNEYS

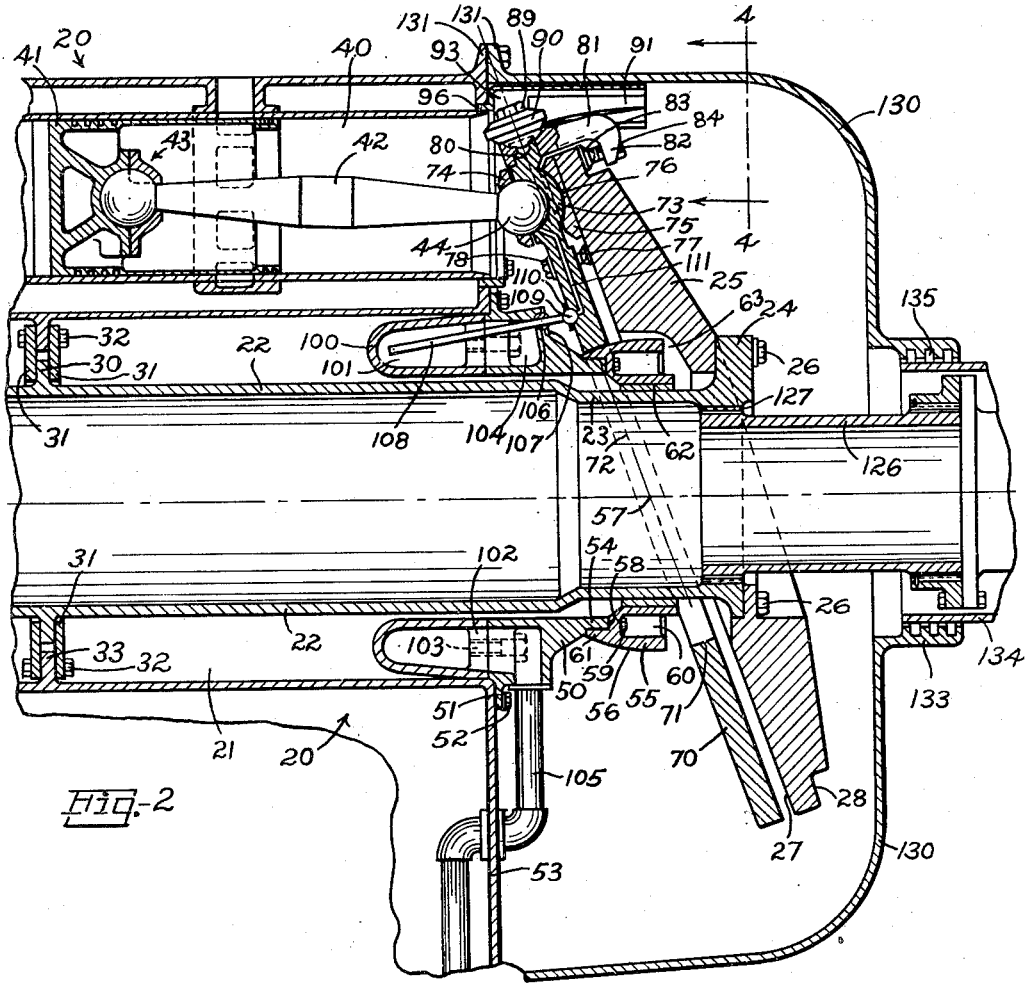
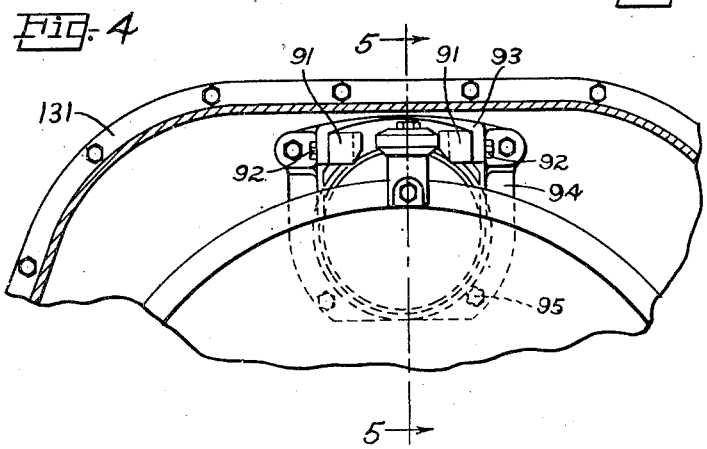
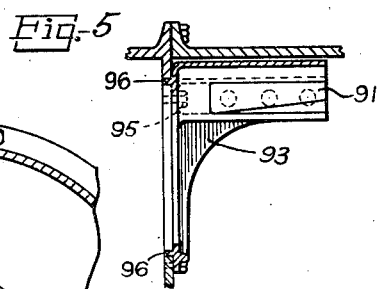

INVENTOR
Thomas L. Sherman
BY
Marechal & Biebel
ATTORNEYS

July 5, 1949.  T. L. SHERMAN  2,475,295
CRANKLESS MECHANISM
Filed March 7, 1946  4 Sheets-Sheet 4
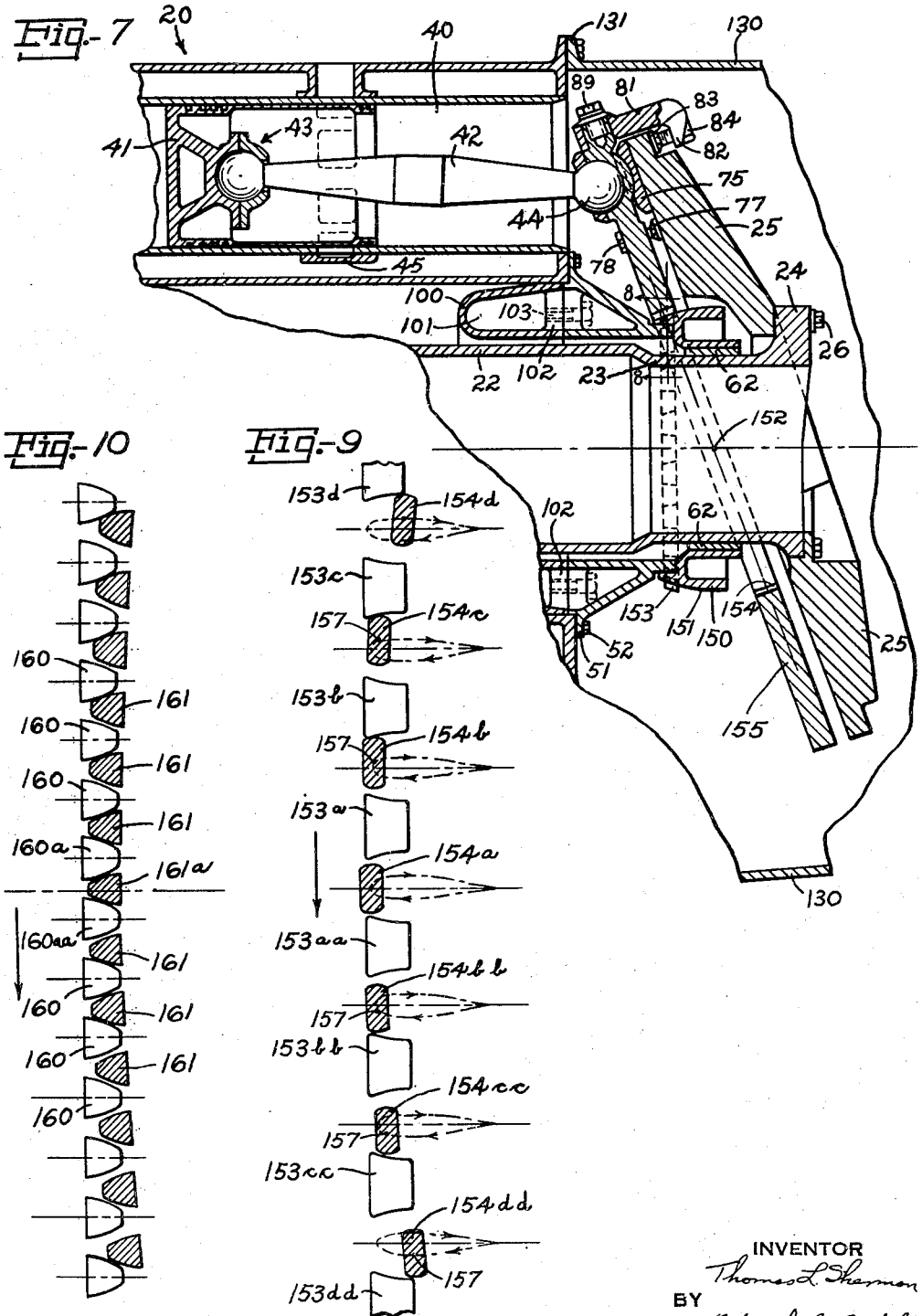

Patented July 5, 1949

2,475,295

UNITED STATES PATENT OFFICE 2,475,295

CRANKLESS MECHANISM

Thomas L. Sherman, Springfield, Ohio, assignor to The Steel Products Engineering Company, Springfield, Ohio, a corporation of Ohio Application March 7, 1946, Serial No. 652,737

22 Claims. (Cl. 74—60)

This invention relates to engines of the crankless type wherein the reciprocating motion of pistons is translated into rotary motion of a shaft through a slant or swash plate secured to said shaft for rotation therewith.

One of the principal objects of the invention is to provide an engine of the above type which may be easily constructed, assembled and serviced, and which may be manufactured and operated with a high degree of economy.

Another object is to provide such an engine of substantially increased efficiency from the standpoints of vibration and loss of power through improved coaction between the cage member and the means provided for its rotational control.

Another object is to provide such an engine wherein the cage is not carried by the rotary slant and slant-shaft but by a support independent of the slant and directly attached to the body of the engine.

Another object is to provide such an engine wherein the member locating the cage and the guide cams therefor are carried by the same structure in predetermined constant relation which can be more accurately determined and maintained than in such engines wherein the cage is carried by means attached to rotating slant or slant shaft.

Another object is to provide an engine of the above type wherein the cage is supported on a spherical mount which is rigidly secured to the engine block and wherein the guide cams for the cage are mounted in fixed relation to the cage and cage mount, for example on the engine block or on the mount itself, in which latter case they may be formed integrally with the mount and with the cage.

Another object is to provide an engine of the above type wherein the housing for the cage and slant does not carry any of the operating parts of the engine, thus affording increased accessibility to the engine and decreased weight in the housing itself, facilitating removal of the housing for servicing and the like.

Another object is to provide a simple reliable and effective lubricating system for the joints between the piston rods and the slipper bearing elements and other such requirements associated with the cage of an engine of this type.

Another object is to provide increased accessibility to an engine of the above type by means including telescoping shafts for transmitting power from the slant-shaft to externally driven elements.

Other objects and advantages of the invention will be apparent from the following description, the accompanying drawings and the appended claims.

In the drawings, in which like characters of reference designate like parts throughout—

Fig. 2 is an enlarged view similar to Fig. 1 but showing only a portion of the engine;

Fig. 4 is a partial section taken on the line 4—4 in Fig. 2;

Fig. 5 is a detailed section taken on the line 5—5 in Fig. 4 with the roller and support therefor removed;

Fig. 7 is a view similar to Fig. 2 illustrating a modified form of the invention wherein the cam guides for the cage are carried by the spherically curved cage mount;

Fig. 9 is a diagrammatic view illustrating the operation of the cam guides shown in Figs. 7 and 8; and Fig. 10 is a view similar to Fig. 9 illustrating the operation of another modification of the invention.

Figure 1:
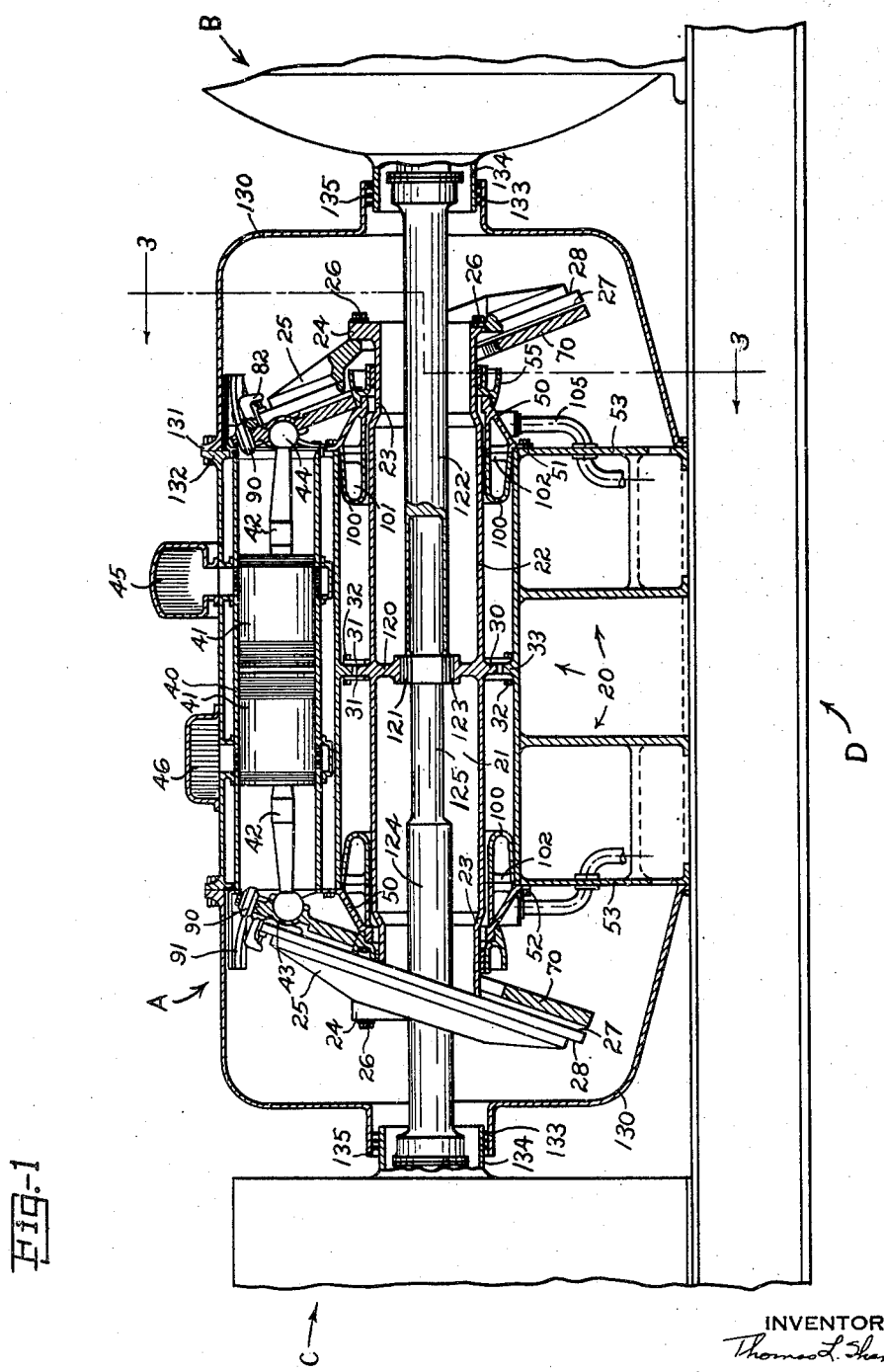
Fig. 1 is a view in vertical section illustrating an engine embodying a preferred form of the present invention.

Referring to the drawings which illustrate preferred embodiments of the invention, in Fig. 1, the engine designated generally as A is illustrated as driving a main driven unit B and an auxiliary driven unit C, all three being shown as mounted on a common base D such as a welded steel or cast frame. Engine A includes an engine block 20 or equivalent casing provided with a substantially cylindrical open bore 21 running substantially through the middle thereof and adapted to receive slant shaft 22. Shaft 22 is shown as hollow and with each end reduced in diameter at 23 and provided with a flange 24 to which a slant member or swash plate 25 is rigidly but removably secured by means of bolts 26. The inner surface 27 of each slant is substantially plane, and an outer surface 28 is provided by a peripheral flange-like portion substantially parallel to inner surface 27, the purpose of which will be described hereinafter. Shaft 22 is also provided with an annular flange 30 projecting radially outward substantially intermediate its ends, which is shown as engaged between two thrust or locating bearings 31 secured by means of bolts 32 to an annular flange 33 extending inwardly from block 20 in bore 21.

Block 20 is provided with a plurality of cylinders 40 arranged substantially parallel to bore 21 and uniformly disposed about the outer portion of the block. As is shown particularly in Fig. 3, there are five cylinders, each of which as in Figs. 1 and 2 has a pair of pistons 41 mounted therein for reciprocation in opposite directions parallel to bore 21 and shaft 22, each piston being provided with a suitable piston rod 42 connected thereto at one end by a ball and socket joint designated generally as 43 and having a similar ball portion 44 at its other end. Cylinders 40 are also illustrated as provided with suitable manifolds 45 and 46 for exhaust and intake purposes.

At each end of block 20 there is mounted an annular supporting member 50 substantially concentric with bore 21. As shown in Fig. 2 each member 50 is provided with an outer flange 51 adapted to be secured by bolts 52 to the end walls 53 of block 20. Each member 50 projects substantially beyond the end wall of the block and its outer end 54 has secured thereto an annular mount member 55 having its outer surface 56 spherically curved about a center point 57 lying along the axis of bore 21 and shaft 22. As shown, at its inner end mount 55 is bored out to form an annular shoulder 58 adapted to abut outer end 54 of supporting member 50 and is rigidly connected thereto by means of bolts 59 countersunk at 60 in the outer end of the mount 55. The annular portion 61 projecting at the inner end of mount 55 beyond shoulder 58 engages in telescoping relation with the outer end 54 of supporting member 50, assures accurate radial location and adds further rigidity to the structure. Bearing 62 supports slant shaft 22 for rotational movement in mount 55. Slant 25 is partially hollowed out at 63 to provide clearance for mount 55.

Cage member 70 is shown as annular in form and is mounted for oscillating movement on the spherically curved surface of one of mounts 55, the inner rim 71 of the cage being similarly spherically curved to match the curvature of the mount. The central plane of the cage, which is indicated by a dotted line 72, passes through the center 57 of curvature of mount 55, and it will accordingly be seen that said point 57 is the center of oscillatory movement of the cage with respect to the mount. It should also be noted that each of main bearings 62 which support main shaft 22 is preferably so disposed in mount 55 that it is closely adjacent or overlies axially said center 57 of oscillatory movement of the cage.

The inner surface of each cage 70 is formed with a plurality of sockets 73 into which the ball ends 44 of pistons 42 are adapted to engage and to be locked by means of suitable collars 74. The outer surface of cage 70 carries a plurality of slipper pad bearing elements 75, mounted for pivotal movement as indicated at 76 on the opposite surface of cage 70 from each socket 73. The bearing surface of each bearing 75 engages inner surface 27 of slant 25. A plurality of small slipper bearings 77, at least one for each bearing 75, are mounted by means of supports 78 between bearings 75 and the inner rim 71 of the cage to carry unbalanced reactions from bearings 75 and the piston rod forces which might otherwise tend to produce distortion in the cage member itself.

Cage 70 is provided on its outer periphery with a plurality of cylindrical stud members 80 extending radially outward from its outer rim and in line with plane 72 passing through the center of oscillation 57. A bridge member 81 is removably secured at one end to each of studs 80, as by the pivotal mounting shown in Fig. 2, and its other end forms a right angled arm portion 82 adapted to embrace the outer edge of slant 25. A small slipper bearing 83 is adjustably carried by each bridge member, being shown as pivotally mounted on the end of a screwed abutment 84 threaded through each bridge arm 82, and engages planar portion 28 on the front surface of the slant. These bearing elements combine to maintain the cage and slant in substantially constant relation axially while at the same time permitting the slant to rotate freely with shaft 22 with respect to the cage. A roller member 90 is rotatably mounted on the outer end of each of studs 80 and is held in position by a bolt 89 threaded axially into this outer stud end. This construction provides for ready separation of the slant from the cage by simply releasing bolts 89 and disengaging rollers 90 and the bridge members from the cage, after which the slant may readily be removed from shaft 22 by releasing bolts 26. The cage may then be adjusted manually on mount 55 to a position substantially perpendicular to the axis of shaft 22, and in this position the inner portion of the engine is readily accessible without further movement of the mechanism.

Figure 3:
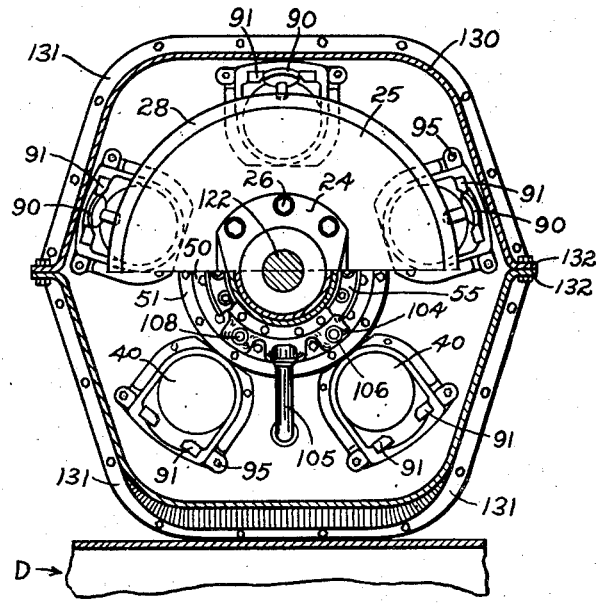
Fig. 3 is a vertical section taken on the line 3—3 in Fig. 1.

Roller members 90 are adapted to engage cam members 91 which serve to guide the oscillatory movement of the cage. Guide cams 91 are arranged in pairs and are shown in Figs. 3 and 4 as secured by means of bolts 92 to member 93 adapted to locate concentrically at the outer end of one of cylinders 40. A flange portion 94 projecting from member 93 is adapted to be bolted at 95 or otherwise rigidly secured to the end wall 53 of block 20. Each member 93 is also shown as including a cylindrical portion 96 adapted for insertion in the cylinder or an appropriate annular recess adjacent the cylinder in the end of the block to provide for additionally locating and supporting the member and guide cams carried thereby. For preferred operation of the engine, each of guide cams 91 will have its guiding surface formed in the shape of approximately one-half of a lemniscate curve and will thus operate to impart lemniscate motion to cage 70 during operation of the engine. A detailed discussion of the shape and operation of cam members suitable for use as guide cams 91 will be found in copending application Serial No. 481,734, filed April 3, 1943, now Patent No. 2,430,788 and assigned to the same assignee as this application.

It should also be noted that guide cams 91 are of such dimensions that they extend outwardly from the end wall of block 20 only as far as the central plane for oscillation of cage 70, i. e. the plane perpendicular the axis of shaft 22 which passes through the center 57 of curvature of mount 55. This arrangement is made possible by the use of five or more pairs of guide cams and provides that rollers 90 will at all times rotate in the same direction when in engagement with one of guide cams 91, thus preventing frictional losses as explained in the above identified copending application.

The above construction provides a substantially rigid connection between the mount 55 whereon cage 70 is mounted and the cams which through rollers 90 guide the oscillatory movement of the cage on said mount, since both the mount and the guide cams are rigidly secured to the same supporting member, which in this embodiment of the invention is the end wall of the engine block. This construction provides that the relative positions of the cage mount and the guide cams are fixed at the time of assembly of the engine and remain so fixed and in properly aligned relation during its operation. It eliminates the relatively large diameter heavily loaded bearings necessary in this type of engine when the cage is carried by the slant, thus producing a material reduction in friction losses. Moreover, when the cage is carried by the slant, it is subject to deflection with the slant as a result of the heavy loads applied to the slant and its shaft, and such deviations from the true central position tend to interfere with the proper relative location of the rollers with respect to the guide cams. In accordance with the present invention, the reaction forces from the piston rods exerted on the cage parallel to the slant face are transferred directly to mount 55 and thence back to the engine block, and the tangential forces are carried by guide cams 91 and so similarly transferred to the engine block. The forces on the slants are directly transferred to thrust bearing 31 and are balanced by an equal opposite force provided by the opposed piston arrangement illustrated in Fig. 1. At the same time, reaction forces at right angles to the main shaft axis are carried by main bearing 62, whose position proximate to the center of oscillation of the cage, as described, further aids in balancing the forces of operation of the engine against distortion of the shaft. All of these features have the further result of reducing friction losses and thus aid in increased efficiency in operation.

Figure 6:
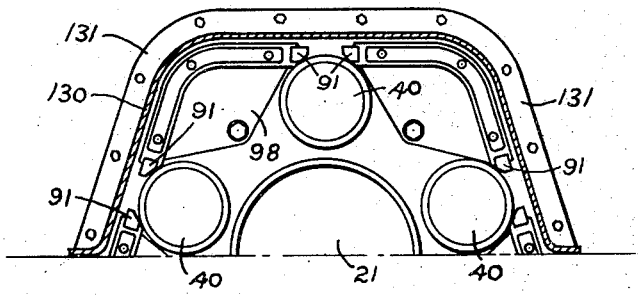
Fig. 6 is a partial view in elevation of the end of the engine block with the slant and cage removed and illustrating modified mounting means for the cam guides for the cage.
Figure 8:
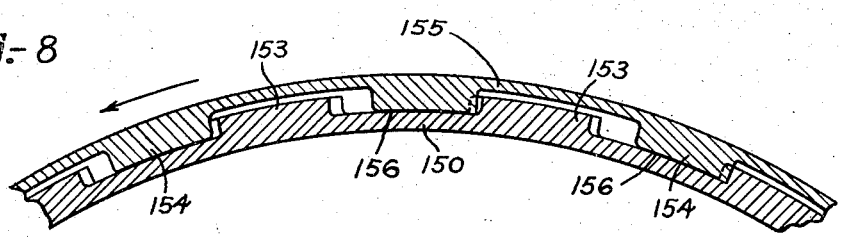
Fig. 8 is an enlarged partial section taken on the line 8—8 in Fig. 7.

Fig. 6 illustrates modified means for mounting guide cams 91' on the engine block. As shown, said cams are bolted to a member 98 extending perpendicularly outward from the face of the engine block between each pair of cylinders. The operation of the engine with this modified mounting is substantially identical with that just described and has substantially identical advantages in that it affords the same rigid structural relationship between the guide cams and the hub whereon the cage oscillates.

Figs. 2 and 3 illustrate in detail means for lubricating sockets 73 and other elements associated with the cage. As shown, supporting member 50 for mount 55 carries at its inner end an annular member 100 formed to provide an annular space 101 adapted to serve as a reservoir for oil or other suitable lubricant. Member 100 includes at its outer end a plurality of radial webs 102 adapted to be secured through bolts 103 to supporting member 50. Member 50 in turn includes a plurality of hollow chambers or cells 104 adapted to coincide with the spaces between webs 102 to provide a totally enclosed structure. A pipe 105 is adapted to provide a continuous supply of oil to one of cells 104 and thence to the remainder of reservoir 101. The outer surface of each of the other cells 104 is provided with an opening including a socket which receives a ball member 106 retained therein by a suitable collar 107. Each ball 106 has a tubular bore therethrough coaxial with a diameter and adapted to receive a tube 108 for sliding but substantially oil-tight movement therein. One end of each tube 108 extends into oil reservoir 101 and the other end comprises a ball 109 engaging in a suitable socket on the inner surface of cage 70 and held therein by a suitable collar 110. A duct 111 leads from this socket radially outward in cage 70 and opens into socket 73. By means of this construction tubes 108 are free to reciprocate and oscillate with the cage while maintaining communication between oil reservoir 101 and the cage and thus provide for a continuous flow of oil to the piston rod socket and contiguous points requiring lubrication such as rollers 90, bearing 75 and 83 and/or other relatively moving parts of the assembly.

Figs. 1 and 2 illustrate two alternative means for transmitting power from shaft 22. In Fig. 1, shaft 22 is shown as provided with an internal flange 120 adapted at 121 for splined connection with one end of a shaft 122 leading to main driven unit B. Shaft 122 is in turn illustrated as at least partially hollow and adapted for further splined connection at 123 to a shaft 124 leading to auxiliary driven unit C and having its inner end 125 of reduced diameter adapted to telescope with shaft 122. This construction provides for a power take-off from substantially the nodal point of shaft 22, which has substantially no vibratory distortion, as explained in Patent No. 2,250,608, issued July 29, 1941, and assigned to the same assignee as this application. It permits sufficient freedom of movement of the shafts to relieve against strains arising from misalignments due to deflections under operating conditions or caused by inaccuracies of construction. It also provides for simple assembly and disassembly by permitting the shafts 122 and 125 to be telescoped so that the outer ends of such shafts will not obstruct the removal of slants for servicing of the inner portions of the engine cage and piston system.

Fig. 2 shows a modified connection to shaft 22, in which the shaft 126 leading to main driven unit B is splined at 127 directly to the outer end of shaft 22. Since this connection is close to the support of shaft 22 by bearings 62 in the stationary mount 55, it also is substantialy free from lateral displacement and provides for efficient take-off of power from the main driven shaft with similar facilities for disassembly as referred to above.

The entire cage and slant assembly is shown in Figs. 1 and 2 as enclosed within a housing 130, preferably formed in two parts as shown in Fig. 3 and provided with suitable flanges 131 and 132 for bolted connection to each other and to the engine block. The cage and slant construction provides that housing 130 carries none of the moving parts of the engine and thus may be made relatively light in weight to serve simply as an enclosure to retain oil and to exclude dirt. Furthermore, this makes it possible to assemble and adjust all moving parts of the engine before the housing is put on. The two-piece construction of the housing is an aid to quick assembly and disassembly to provide access to the interior of the engine. The outer end of each housing 130 is shown as provided with a gland portion 133 adapted for telescoping engagement with a similar gland 134 on the housing of the adjacent driven unit B or C and provided with suitable oil retaining rim members 135 to retain any lubricant thrown off from the engine in operation.

Figs. 7 to 10 illustrate modified forms of the engine shown in Figs. 1 to 6, wherein the guide cams for the cage are provided directly on the spherical mount 55 instead of being mounted on the engine block. In the form of the invention shown in Figs. 7 to 9, mount 150 corresponds generally to mount 55 in Figs. 1 to 6, being similarly mounted on the engine block through supporting member 50 and having a similarly spherically curved outer surface 151 with its center of curvature at a point 152 lying along the axis of the main engine shaft. Mount 150 carries on its surface 151, and preferably integrally formed therewith, a plurality of spaced fixed guide cam members 153 adapted to engage complementary moving cam members 154 similarly integrally formed along the inner rim of annular cage member 155, this arrangement of cam members being illustrated in Figs. 7 and 8. The surface portions of mount 150 in supporting contact with cage 155 are indicated at 156 in Fig. 8. The individual cam shapes are shown most clearly in Fig. 9, which is an exaggerated diagrammatic view illustrating the projection on a plane surface of a section taken in Fig. 8 along an arc concentric with the mount and cage and lying between the outer surfaces of cams 153 and the surface of the inner rim of cage 155, cams 153 being shown in elevation and cams 154 in section. As shown in Fig. 9, the adjacent sides of cam member 153 are concave and converge towards the engine block, and these sides are so formed as to impart lemniscate motion to the cage.

The operation of these cam members in guiding the oscillatory movement of cage 155 is illustrated diagrammatically in Fig. 9, wherein the dotted portions of lemniscate curves illustrate the desired path of the center 157 of each of the moving cams 154. The cam member designated 154a is shown at the limit of its oscillatory movement with the cage towards the engine block, i. e. to the left as viewed in Fig. 9, corresponding to the inner dead center portion of its adjacent piston. In this position cam 154a will be substantially equidistant circumferentially from its adjacent fixed cam members 153a and 153aa on the mount 150 and will be out of contact with both. With the cage in this position and assuming that the rotation of the slant is counterclockwise as indicated by the arrows in Figs. 8 and 9, the face of cam member 154b which trails in the direction of rotation of the slant will be in contact with its adjacent guide cam 153b and towards the inner end thereof. Similarly the trailing faces of cam members 154c and 154d will be in contact with their adjacent guide cams 153c and 153d respectively but each at points further advanced towards the outer ends of the stationary cams. During the complete cycle of oscillation of cage 155, the center 157 of each of cams 154 will follow a lemniscate curve, as is indicated by the half-curves shown in Fig. 9. Therefore, the next and succeeding cam members 154 along the inner rim of cage 155 beyond cam 154d will be out of contact with their adjacent stationary cam members 153 around the periphery of mount 150. The cam members 154 corresponding to members 154b, 154c and 154d adjacent the opposite side of cam member 154a, which are identified as 154bb, 154cc and 154dd, are carried by the portion of the cage moving towards the engine block as the adjacent pistons approach their inner dead center positions, and they will run just free of contact with adjacent cam members 153, as indicated in the lower portions of Fig. 9, to leave running clearance. It follows that under the assumed conditions of operation under power, cam members 153 will carry, on their sides adjacent the trailing faces of cam members 154 as shown in Fig. 9, the load arising from the tangential power torque reactions of the piston-slipper-slant coactions on their working strokes, and these cam members 153 will carry on their opposite, or upper sides in Fig. 9, the opposite tangential reactions when the engine is idling or running unsteadily or is motored over by external means.

It will be seen, therefore, that in the operation of the engine, as described, the torque reactions will be carried progressively by a plurality of adjacent cam members 153 on the stationary mount 150. Furthermore, since a multiplicity of cam members is provided—eighteen in the illustrated construction—this results in distributing the torque load over a greater portion of the hub and at the same time makes it possible to form the individual stationary cams of substantially smaller side, i. e. with substantially shorter cam surfaces, in the direction axially of the shaft than in the case of a smaller number of guide cams as in the embodiment of the invention shown in Figs. 1 to 5. Thus, whereas in the embodiment of Figs. 1–6 the cam members extend out from the end of the engine block substantially to the mid-plane of oscillatory movement of the cage as described, in the embodiment shown in Figs. 7 to 9 each cam member 154 is in contact with a cam member 153 for but a short period during which it shares the load with at least one and preferably two or more other cam members 153, thus materially reducing wear on the individual cam members. Another advantageous feature of this construction is that it permits the cam members to be made integral with the spherically curved mount which not only simplifies manufacture and makes possible a high degree of uniformity, but also provides that the relative positioning of the cage and the mount will be determined and controlled during their manufacture and will require substantially no further adjustment at the time of assembly of the engine or otherwise. Furthermore this embodiment of the invention possesses the same advantages as the embodiment first described in that the stationary cam members are permanently and rigidly fixed in position with respect to the mount which supports the cage and whereon the cage oscillates.

Fig. 10 is a view generally similar to Fig. 9 illustrating a still further modified form of guide means for the engine of the present invention. This modification is generally similar to that shown in Figs. 7 to 9 in that cam members 160 are integrally formed on or otherwise secured to the spherically curved mount whereon the cage member oscillates and cam members 161 are formed similarly to cam members 153 and similarly carried by the inner rim of the cage member. In this modification, however, each cam member has the general shape of a gear tooth, with its camming surfaces convexly. These camming surfaces may be formed to coincide with an involute curve, in which case although they will not impart true lemniscate motion to the cage, their approximation thereof will be sufficiently close so that they are quite suitable for use in machines or engines operated at relatively low speeds or with less heavily stressed construction. The operation of the engine with this form of cam members is shown in Fig. 10 in a manner similar to the showing in Fig. 9, with moving cam member 161a in a position between cam members 160a and 160aa corresponding to that of cam member 154a and its adjacent cam members 153a and 153aa. With this embodiment, however, the respective cam members are closer together circumferentially, and instead of the arrangement shown in Fig. 9 wherein cam member 154a is out of contact with cam members 153a and 153aa at the limit of its rearward movement, cam member 161a is shown in Fig. 10 as in theoretical contact with both its adjacent stationary cam members 160a and 160aa. Otherwise this embodiment of the invention operates similarly to that shown in Figs. 7 to 9, and although in this embodiment the individual cam members are of substantially lesser width and a greater number of cam members will be in camming contact at one time than in the case illustrated in Fig. 9, as indicated in Fig. 10, the load will be progressively transferred around the periphery of the mount in the same manner.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In mechanism of the character described, the combination of an engine block, a cylinder carried by said block, a piston adapted for reciprocating movement in said cylinder, a shaft mounted for rotation about an axis substantially parallel to the direction of reciprocation of said piston, a slant member secured to said shaft for rotation therewith, a spherically curved mount member secured to said block substantially coaxially with said shaft, a cage member mounted for oscillatory movement on said mount and with its outer face adapted to engage the inner face of said slant, guide cam means for said cage member carried by said block in substantially fixed relation with said mount, bearing means between said cage and slant faces, and a piston rod connecting said piston and the inner face of said cage.

2. In mechanism of the character described, the combination of an engine block, a sperically curved mount member secured to said block and projecting therefrom, a cage member mounted for oscillatory movement on said mount, guide cam means for said cage member carried by said block in substantially fixed relation with said mount, and a slant mounted for relative rotation with respect to said block and with its surface adjacent said block adapted to engage the outer face of said cage.

3. In mechanism of the character described, the combination of an engine block, an annular mount member having its outer surface spherically curved, said mount being secured to said block and projecting therefrom, a shaft journalled in said block and mount and projecting therefrom, a slant member secured to said projecting shaft for rotation therewith, an annular cage member mounted for oscillatory movement on said mount and having its outer face adapted to engage the inner face of said slant, bearing means between said cage and slant faces, guide cam means carried by said block in substantially fixed relation to said mount, and complementary means carried by said cage cooperating with said guide cam means to control the oscillatory motion of said cage.

4. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, a cage member mounted for oscillatory movement on said mount and including an annular member positioned with its central plane passing through the center of curvature of said mount, the outer face of said cage being adapted to engage the inner face of said slant, bearing means between said cage and slant faces, guide cam means carried by said block in substantially fixed relation to said mount and complementary means carried by said cage and cooperating with said guide cam means to control the oscillatory motion of said cage.

5. In mechanism of the character described, the combination of an engine block, an annular mount member having its outer surface spherically curved, said mount being secured to said block and projecting therefrom, a shaft journaled in said block and mount and projecting therefrom, annular bearing means supporting said shaft in said mount and positioned proximate to the center of curvature of said mount, a slant member secured to said projecting shaft for rotation therewith, a cage member mounted for oscillatory movement on said mount and including an annular member positioned with its central plane passing through the center of curvature of said mount, the outer face of said cage being adapted to engage the inner face of said slant, bearing means between said cage and slant faces, guide cam means carried by said block in substantially fixed relation to said mount, and complementary means carried by said cage and cooperating with said guide cam means to control the oscillatory motion of said cage.

6. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a plurality of guide cam members secured to said block and spaced radially from said mount, and a plurality of roller members projecting radially from said cage, said rollers engaging said cams for guiding the oscillatory motion of said cage.

7. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a plurality of guide cam members secured to said block and spaced radially from said mount, and a plurality of roller members mounted on said cage for rotation about axes radially arranged with respect to said cage and lying within a plane passing through the center of curvature of said mount, said rollers engaging said cams for guiding and oscillatory motion of said cage.

8. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, at least five pairs of guide cam members secured to said block and spaced radially from said mount, said cams extending outwardly from said block but terminating at least at the plane perpendicular to said shaft which includes the center of oscillatory motion of said cage, and a plurality of roller members projecting radially from said cage, said rollers engaging said cams for guiding oscillatory motion of said cage.

9. In mechanism of the character described, the combination of an engine block, a spherically curved mount member secured to said block and projecting therefrom, a cage member mounted for oscillatory movement on said mount, a plurality of guide cam members carried by and projecting outwardly from said spherically curved mount, and a plurality of complementary cam members carried by said cage and engaging said cam members on said mount to guide the oscillatory movement of said cage.

10. In mechanism of the character described, the combination of an engine block, a cylinder in said block, a piston adapted for reciprocating movement in said cylinder, a shaft mounted for rotation about an axis substantially parallel to the direction of reciprocation of said piston, a slant member secured to said shaft for rotation therewith, a spherically curved mount member secured to said block substantially coaxially with said shaft, a cage member mounted for oscillatory movement on said mount and with its outer face adapted to engage the inner face of said slant, a piston rod connecting said piston and the inner face of said cage, a plurality of guide cam members carried by and projecting radially from said mount, and a plurality of complementary cam members carried by said cage and projecting radially inward with respect thereto, said complementary cam members engaging said cam members on said mount to guide the oscillatory movement of said cage.

11. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a plurality of guide cam members carried by and projecting radially from said spherically curved surface of said mount, and a plurality of complementary guide cam members carried by said cage and projecting radially inward with respect thereto, said complementary cam members engaging said cam members on said mount to guide the oscillatory movement of said cage.

12. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a plurality of guide cam members carried by and projecting radially from said spherically curved surface of said mount, and a plurality of complementary guide cam members carried by said cage and projecting radially inward with respect thereto, said complementary cam members engaging said cam members on said mount to guide the oscillatory movement of said cage, each of said cam members on said mount having concave sides converging toward the engine block with respect to the adjacent sides of adjacent cam members, adjacent cam members on said mount being spaced from each other by a distance sufficient to receive said cam members on said cage freely therebetween.

13. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a plurality of guide cam members carried by and projecting radially from said spherically curved surface of said mount, and a plurality of complementary guide cam members carried by said cage and projecting radially inward with respect thereto, said complementary cam members engaging said cam members on said mount to guide the oscillatory movement of said cage, said cam members having the general formation of gear teeth with convexly curved side faces, said cam members on said mount facing axially outwardly and said cam members on said cage facing axially inwardly with respect to said engine to provide for engagement therebetween.

14. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a cylinder in said block, a piston adapted for reciprocating movement in said cylinder parallel to said shaft, a piston rod carried at one end by said piston and having its other end engaged in a socket in said cage, guide cam means carried by said block in substantially fixed relation to said mount and complementary means carried by said cage cooperating with said guide cam means to control the oscillatory motion of said cage.

15. In mechanism of the character described, the combination of an engine block, an annular mount member having its outer surface spherically curved secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a cylinder in said block, a piston adapted for reciprocating movement in said cylinder parallel to said shaft, a piston rod carried at one end by said piston and having its other end engaged in a socket in said cage, and means for lubricating said socket including an oil reservoir carried by said block and a tube carried at one end by said cage for oscillatory movement therewith and with its other end communicating with said oil reservoir.

16. In mechanism of the character described, the combination of an engine block, a cylinder in said block, a piston adapted for reciprocating movement in said cylinder parallel to said shaft, an annular supporting member secured to said block and including an annular oil reservoir, means for introducing oil to said reservoir, an annular mount member having its surface spherically curved, said mount being secured to said supporting member and projecting therefrom, a shaft journaled in said supporting member and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, a piston rod carried at one end by said piston and having its other end engaged in a socket in said cage, a passage for oil in said cage leading from said socket to the inner face of said cage near said hub, a tube having a balled end engaged in a socket at the inner end of said passage for reciprocable movement with said cage, said tube extending into said reservoir in said supporting member to transmit oil to said piston rod socket, guide cam means carried by said block in substantially fixed relation to said mount, and complementary means carried by said cage and cooperating with said guide cam means to control the oscillatory motion of said cage.

17. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, the outer periphery of said cage being provided with a plurality of spaced stud members projecting radially outward, a bridge member removably secured to each of said studs, each of said bridge members including a substantially right-angled arm adapted to extend perpendicularly out from said cage and to overlap the outer face of said slant, each of said over-lapping arms carrying a bearing member adapted for adjustable engagement with said outer slant face and cooperating with said bearing means between said cage and slant to maintain said cage and slant in substantially constant axial relation, guide cam means carried by said block in substantially rigid relation to said mount, and complementary means carried by said cage cooperating with said guide cam means to control the oscillatory motion of said cage.

18. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, the outer periphery of said cage being provided with a plurality of spaced stud members projecting radially outward, a bridge member removably secured to each of said studs, each of said bridge members including a substantially right-angled arm adapted to extend perpendicularly out from said cage and to overlap the outer face of said slant, each of said over-lapping arms carrying a bearing member adapted for adjustable engagement with said outer slant face and cooperating with said bearing means between said cage and slant to maintain said cage and slant in substantially constant axial relation, a plurality of guide cam members secured to said block and spaced radially from said mount, and a plurality of roller members pivotally mounted on said studs and engaging said cams for guiding oscillatory motion of said cage.

19. In mechanism of the character described, the combination of an engine block, a shaft mounted for rotation about an axis disposed substantially centrally of said block, a slant member secured to said shaft for rotation therewith, an annular cage member mounted for oscillatory movement between said block and said slant with its outer face adapted to engage the inner face of said slant, a cylinder in said block having a piston adapted for reciprocating movement therein parallel to said shaft, a piston rod carried at one end by said piston and having its other end engaged in a socket in said cage, an oil reservoir carried by said block, a passage for oil in said cage leading from said socket to an outlet in the inner face of said cage, a tube pivotally connected to said outlet and communicating with said passage, the other end of said tube extending into said oil reservoir, said tube being adapted to oscillate and reciprocate with said cage while continuing to transmit oil from said reservoir to said piston rod socket.

20. In mechanism of the character described, the combination of an engine block, a shaft mounted for rotation about an axis disposed substantially centrally of said block, a slant member secured to said shaft for rotation therewith, an annular cage member mounted for oscillatory movement between said block and said slant with its outer face adapted to engage the inner face of said slant, a cylinder in said block having a piston adapted for reciprocating movement therein parallel to said shaft, a piston rod carried at one end by said piston and having its other end engaged in a socket in said cage, means providing an annular oil reservoir carried by said block and substantially coaxial with said shaft, means for supplying oil to said reservoir, means providing an opening from said reservoir adjacent said cage and having a socket at its outer end, a ball member in said socket having a bore therethrough coaxial with a diameter thereof, a passage for oil in said cage leading from said piston rod socket to a second socket in the inner face of said cage, a tube having a balled end engaged in said second socket, said tube being journaled in said bore in said ball member in said opening to said oil reservoir and extending into said reservoir, said tube being adapted to reciprocate and oscillate with said cage while maintaining one end in said reservoir to transmit oil therefrom to said piston.

21. In mechanism of the character described, the combination of an engine block, an annular mount member having its outer surface spherically curved, said mount being secured to said block and projecting therefrom, a shaft journalled in said block and mount and projecting therefrom, a slant member secured to said projecting shaft for rotation therewith, an annular cage member mounted for oscillatory movement on said mount and having its outer face adapted to engage the inner face of said slant, bearing means between said cage and slant faces, guide cam means carried by said block in substantially fixed relation to said mount, complementary means carried by said cage cooperating with said guide cam means to control the oscillatory motion of said cage, bridge means removably secured to one of said slant and cage members and embracing the other said member, and a shaft adapted for readily removable telescoping driven connection with said slant shaft to transmit power therefrom, said removable bridge means and said telescoping shaft connection providing for ready separation and disassembly of said engine.

22. In mechanism of the character described, the combination of an engine block, an annular mount member having its outer surface spherically curved, said mount being secured to said block and projecting therefrom, a shaft journaled in said block and mount and projecting therefrom, a slant member secured to said projecting shaft for rotation therewith, an annular cage member mounted for oscillatory movement on said mount and with its outer face adapted to engage the inner face of said slant, bearing means between said cage and slant faces, guide cam means carried by said block in substantially rigid relation to said mount, complementary means carried by said cage cooperating with said guide cam means to control the oscillatory motion of said cage, bridge means removably secured to said cage and embracing the outer slant face to maintain said cage and slant in substantially constant axial relation, and a shaft adapted for ready removable telescoping driven engagement with said slant shaft to transmit power therefrom, said removable bridge means and said telescoping shaft connection providing for ready separation of said slant and said cage facilitating assembly and disassembly of said engine.

THOMAS L. SHERMAN.

REFERENCES CITED

The following references are of record in the file of this patent:

UNITED STATES PATENTS

| Number | Name | Date |
|---|---|---|
| 1,746,335 | Boyce | Feb. 11, 1930 |